(12) United States Patent
Molnar

(10) Patent No.: US 9,998,634 B2
(45) Date of Patent: Jun. 12, 2018

(54) VIDEO FRAME PLAYBACK SCHEDULING

(71) Applicant: Google LLC, Mountain View, CA (US)

(72) Inventor: Lajos Molnar, San Francisco, CA (US)

(73) Assignee: Google LLC, Mountain View, CA (US)

( * ) Notice: Subject to any disclaimer, the term of this patent is extended or adjusted under 35 U.S.C. 154(b) by 510 days.

(21) Appl. No.: 14/530,967

(22) Filed: Nov. 3, 2014

(65) Prior Publication Data
US 2016/0127614 A1 May 5, 2016

(51) Int. Cl.
H04N 5/04 (2006.01)
G11B 27/10 (2006.01)
H04N 5/93 (2006.01)
H04N 5/06 (2006.01)

(52) U.S. Cl.
CPC ............. H04N 5/04 (2013.01); G11B 27/10 (2013.01); H04N 5/06 (2013.01); H04N 5/93 (2013.01)

(58) Field of Classification Search
CPC ............. G11B 27/10; H04N 5/04; H04N 5/93
See application file for complete search history.

(56) References Cited

U.S. PATENT DOCUMENTS

| | | | |
|---|---|---|---|
| 5,610,721 A * | 3/1997 | Higuchi | H04N 1/00291 358/296 |
| 5,909,224 A | 6/1999 | Fung et al. | |
| 6,948,185 B1 | 9/2005 | Chapel et al. | |
| 7,268,826 B2 | 9/2007 | Lundblad et al. | |
| 7,899,302 B2 | 3/2011 | Salomons et al. | |
| 8,279,344 B2 | 10/2012 | Boak | |
| 2003/0128294 A1* | 7/2003 | Lundblad | H04N 5/04 348/515 |
| 2005/0018775 A1 | 1/2005 | Subramanian et al. | |
| 2005/0201399 A1* | 9/2005 | Woodward, Jr. | H04J 3/0632 370/412 |
| 2006/0120462 A1* | 6/2006 | Tsuboi | H04N 21/4305 375/240.25 |
| 2010/0172379 A1* | 7/2010 | Guignard | H04J 3/0647 370/503 |
| 2010/0315441 A1* | 12/2010 | Kang | G09G 3/22 345/690 |
| 2011/0110642 A1 | 5/2011 | Salomons et al. | |
| 2016/0357493 A1* | 12/2016 | Zerwas | G06F 3/1438 |

* cited by examiner

Primary Examiner — Gelek W Topgyal
(74) Attorney, Agent, or Firm — Dority & Manning, P.A.

(57) ABSTRACT

Systems and techniques are provided for video frame playback scheduling. A presentation time for a frame of a video may be received. An offset for the frame of video may be determined based on succeeding frames of the video and Vsync pulse times. The presentation time for the frame of the video may be adjusted based on the offset to generate an adjusted presentation time that is closer to a halfway point between a first Vsync pulse and a second Vsync pulse than the presentation time. A cumulative time correction may be tracked based on adjustments made to the presentation times for frames of the video. A magnitude of the cumulative time correction may be determined to exceed the magnitude of a positive or negative threshold. The cumulative time correction may be added to or subtracted from based on the determination that the magnitude exceeds the positive or negative threshold.

19 Claims, 8 Drawing Sheets

VIDEO FRAME PLAYBACK SCHEDULING

BACKGROUND

When playing back a video on a computing device, individual video frames may be decoded and scheduled to be displayed at a certain time. This may be the presentation time for the frame, and may be related to how far the frame is from where the video was started and the time at which playback was started, and may be based on a reference clock. Assigning a presentation time to a frame based solely on the frame's position in the video and the time at which playback was started may result in poorer video quality due to potential misalignment with Vsync pulses, drifting display refresh rates, and measurement errors and scheduling jitters. When a frame has a presentation time that is very close to the expected time for Vsync pulse, any difference between the expected and actual time for the Vsync pulse may result in the frame being displayed either one Vsync pulse too early, or one Vsync pulse too late. This may degrade the quality of video playback, as the frame may appear on the display of the computing device for a longer or shorter period of time than it was supposed to.

BRIEF SUMMARY

According to an embodiment of the disclosed subject matter, a presentation time for a frame of a video may be received. An offset for the frame of video may be determined based on a succeeding frame of the video and a Vsync pulse time. The presentation time for the frame of the video may be adjusted based on the offset to generate an adjusted presentation time that is closer to a halfway point between a first Vsync pulse and a second Vsync pulse than the presentation time.

The frame of video may be sent to a renderer based on the adjusted presentation time. The offset may be based on 12 succeeding frames. The offset may be an average estimated offset. The offset may be a weighted average estimated offset.

The average estimated offset may be determined by averaging, over the next N succeeding frames to the frame of the video, a presentation time plus a cumulative time correction for each frame, a tracked time difference between successive frames multiplied by the frame number within the set of frames being evaluated minus a tracked base time for a previous Vsync pulse, modulus a tracked time difference between successive Vsync pulses. The tracked time difference between successive Vsync pulses may be a Vsync period.

Adjusting the presentation time may include dividing a Vsync period by two, subtracting the offset from the result of dividing the Vsync period by two to determine a time correction, applying the time correction to the presentation time of the frame of the video to generate the adjusted presentation time, and aligning the adjusted presentation time halfway between the first Vsync pulse and second Vsync pulse, where the first Vsync pulse and the second Vsync pulse are consecutive.

A cumulative time correction may be tracked based on adjustments made to the presentation times for one or more frames of a video. A magnitude of the cumulative time correction may be determined to exceed the magnitude of a positive or negative threshold. The cumulative time correction may be added to or subtracted from based on the determination that the magnitude exceeds the positive or negative threshold.

Half of a Vsync period may be subtracted from the cumulative time correction when the cumulative time correction is positive and is greater than the positive threshold. Half of a Vsync period may be added to the cumulative time correction when the cumulative time correction is negative and is less than the negative threshold. Half of a Vsync period may be subtracted from the cumulative time correction to effect the display of a frame of the video that is designated to be displayed for more than a minimum number of Vsync pulses.

Half of a Vsync period may be added to the cumulative time correction to effect the display of a frame of the video that is designated to be displayed for less than a maximum number of Vsync pulses. The positive threshold may be between 25% of Vsync period and 100% of a Vsync period, and negative threshold may be between negative 25% of a Vsync period and negative 100% of a Vsync period.

According to an embodiment of the disclosed subject matter, a means for receiving a presentation time for a frame of a video, a means for determining an offset for the frame of video based on a succeeding frame of the video and a Vsync pulse time, a means for adjusting the presentation time for the frame of the video based on the offset to generate an adjusted presentation time that is closer to a halfway point between a first Vsync pulse and a second Vsync pulse than the presentation time, a means sending the frame of video to a renderer based on the adjusted presentation time, a means for averaging, over the next N succeeding frames to the frame of the video, a presentation time plus a cumulative time correction for each frame, a tracked time difference between successive frames multiplied by the frame number within the set of frames being evaluated minus a tracked base time for a previous Vsync pulse, modulus a tracked time difference between successive Vsync pulses, a means for dividing a Vsync period by two, a means for subtracting the offset from the result of dividing the Vsync period by two to determine a time correction, a means for applying the time correction to the presentation time of the frame of the video to generate the adjusted presentation time, and a means for aligning the adjusted presentation time halfway between the first Vsync pulse and second Vsync pulse, where the first Vsync pulse and the second Vsync pulse are consecutive, are included.

A means for tracking a cumulative time correction based on adjustments made to the presentation times for one or more frames of a video, a means for determining that a magnitude of the cumulative time correction exceeds the magnitude of a positive or negative threshold, and a means for adding or subtracting from the cumulative time correction based on the determination that the magnitude exceeds the positive or negative threshold.

Systems and techniques disclosed herein may allow for video frame playback scheduling. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
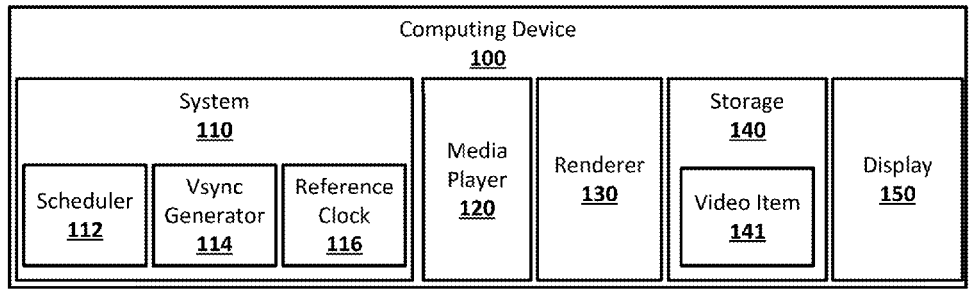
FIG. 1 shows an example system suitable for video frame playback scheduling according to an implementation of the disclosed subject matter.

Video frame playback scheduling may allow for the adjustment of the presentation time for frames of a video and the addition or skipping of Vsync pulses, which may result in smoother video playback. A computing device, such as, for example, a smartphone, tablet, or laptop, may include a media player capable of playing back video from a file on the display of the computing device. The media player may decode frames of video from the file, for example, using a hardware or software decoder. A renderer, which may be a hardware or software component of the computing device, may receive the frames to be rendered on the display. Each decoded frame of the video may include a presentation time, which may indicate the time at which the frame is meant to be displayed on the display of the computing device. A correction delta, or average estimated offset, may be applied to the presentation time for each frame. The average estimated offset may be determined in order to move the presentation time for a frame closer towards the halfway point between Vsync pulses. For example, the average estimated offset may be determined based on the distance between the presentation times for the next N frames of the video, for example 12 or 20 frames, and the nearest scheduled Vsync pulses to those N frames. The average estimated offset may be recalculated for each frame to be displayed. Each frame may then be sent to be displayed based on its adjusted presentation time. A cumulative error between original and adjusted presentation times may also be tracked. When the cumulative error has a large enough magnitude, for example, is a large as the distance between Vsync pulses, half of a Vsync period may be added to or subtracted from the cumulative error, effectively adding or skipping a Vsync pulse. A phase locked loop may be used to estimate when frames of the video will be displayed, and may be used to anticipate the effects of any rate shift.

A computing device may include a media player. The media player may be used to playback video files, which may be stored on the computing device, external storage connected directly to the computing device, streamed from a remote storage, such as, for example, a server, or received from a live source, such as broadcast TV received through streaming, over-the-air, or through a cable or other connection. The media player may decode frames from the video and send them frames to a renderer on the computing device. The renderer may display the frames on the display. Each decoded frame may have an associated presentation time, which may indicate when the frame is expected to appear on the display. For example, if playback of a video with a frame rate of 24 frames per second is started and the first frame is displayed at a time of $1/24$ seconds, the second frame may have a presentation time of $2/24$ seconds, the third frame may have a presentation time of $3/24$ seconds, and so on.

The renderer may output frames to be displayed on the display based on Vsync pulses. The Vsync pulses may be generated by, for example, a component of the operating system of the computing device or by the display. The Vsync pulses may occur at a rate that matches the refresh rate of the display of the computing device. For example, if the display has a refresh rate of 60 Hz, the Vsync pulses may occur at a rate of 60 Hz. On each Vsync pulse, the frame currently at the renderer may be displayed on the display. For example, a video with a frame rate of 24 frames per second may send a frame to the renderer just before $3/24$ seconds, which may be the presentation time for the frame. The Vsync pulse rate may be 60 Hz, which may result in the frame being displayed on the next Vsync pulse that occurs after $3/24$ seconds. This may be a Vsync pulse that occurs at $8/60$ seconds.

The Vsync pulse rate may be subject to errors, for example, from Vsync, measurement, or scheduling jitter. The display may also be subject to a drifting display refresh rate, for example, due to environmental factors. These errors may result in Vsync pulses not occurring at their expected times. This can result in the scheduled presentation times for frames from a video being played back ending up on the wrong side of a Vsync pulse. For example, when a video is played at 24 frames per second on a display that refreshes at a rate of 60 Hz, 3:2 pull-down may be used to ensure that the video plays at the proper rate and the display has frame to show on each refresh cycle. A first frame of the video may be displayed for two refresh cycles, a second frame for three refresh cycles, a third frame for two refresh cycles, and a fourth frame for three refresh cycles. If there is enough error in the timing of Vsync pulses, a frame that was meant to be displayed for two cycles may end up being displayed for three cycles. The first frame may be displayed for two refresh cycles, and two Vsync pulses, of the display. The second frame may have a presentation time that should allow it to be at the renderer before the third Vsync pulse. However, if the presentation time is very close to the expected time for the third Vsync pulse, and the third Vsync pulse arrives earlier than the expected time, the second frame may not be at the renderer in time to be displayed, and the first frame may be displayed a third time. For example, if the second frame has a presentation time of $43/480$ seconds, and the third Vsync pulse is expected to occur at $^{44}/_{480}$ seconds, but actually occurs at $^{42}/_{480}$ seconds, the second frame may not be at the renderer in time for the third Vsync pulse. This may result in a noticeable degradation of the video quality.

The scheduling of the individual frames of a video may be adjusted to prevent a frame from arriving too late or too early for a Vsync pulse. The presentation time of a frame may be adjusted to maximize the presentation time's distance from neighboring Vsync pulses, placing the presentation time closer to halfway between the expected times for neighboring Vsync pulses. This may allow for more error in the timing of Vsync pulses without resulting in frames being displayed for longer of shorter than was intended. For example, the frame with a presentation time of $^{43}/_{480}$ may be between Vsync pulses expected to occur at $^{44}/_{480}$ seconds and $^{36}/_{480}$ seconds. Because the presentation time is so close to the expected time for the Vsync pulse at $^{44}/_{480}$, an error in the Vsync pulse timing, for example, due to clock drift, which causes the Vsync pulse to occur $^{1}/_{240}$th of second earlier than expected may result in the frame not being at the renderer in time for the Vsync pulse. The presentation time for the frame may be adjusted, for example, moving the presentation time from $^{43}/_{480}$ seconds to $^{40}/_{480}$ seconds, halfway between the Vsync pulse at $^{36}/_{480}$ seconds and the Vsync pulse at $^{44}/_{480}$ seconds. By adjusting the presentation time of the frame, a much larger error of $^{4}/_{480}$ths of a second would need to occur in the Vsync pulse timing to cause the frame to be rendered to the display too early or too late.

The adjustment to the presentation time of a frame may be a based on an average estimated offset. The average estimated offset may be determined based on a number of frames that follow the current frame. For example, for a display with 60 Hz refresh rate, the next 12 frames may be used to determine the average estimated offset, unless the video has a frame rate of 50 frame per second, in which case 20 frames may be used. For a display with 50 Hz refresh rate, the next 12 frames may be used. Any other suitable number of frames, greater than two, may also be used in determining the average estimated offset. The frames may also be non-consecutive. The average estimated offset may be determined as a simple average or a weighted average. For example, the average estimated offset may be determined by averaging, over the next N frames, the presentation time plus a cumulative time correction, a tracked time difference between successive frames multiplied by the frame number within the set of frames being evaluated minus a tracked base time for a previous Vsync pulse, modulus a tracked time difference between successive Vsync pulses. The Vsync period may then be divided by two and have the average estimated offset subtracted from it to determine a time correction, which may be applied to the presentation time of the current frame, resulting in an adjusted presentation time for the frame. The current frame may then be sent to the renderer based on the adjusted presentation time, which may make it less likely that the current frame arrives either too early or too late and is instead displayed on the appropriate Vsync pulse.

The tracked cumulative time correction may increase or decrease across the playing time of a video. For example, after some number of frames, the tracked cumulative time correction may be equal in magnitude to the time between Vsync pulses, for example, $^{1}/_{60}$th of a second on display that refreshes at 60 Hz. The tracked cumulative time correction may be positive or negative. When the tracked cumulative time correction has magnitude that is greater than a threshold, a Vsync pulse may be added or skipped. The threshold may be, for example, the time between Vsync pulses, or any suitable percentage thereof. For example, if the tracked cumulative time correction has a positive value that is greater than the time between Vsync pulses, which may be Vsync period, then the cumulative time correction may be adjusted downwards by half a Vsync period. This may result in the presentation time of the next frame being adjustment in a manner equivalent to skipping a Vsync pulse. If the tracked cumulative time correction has a negative value with a magnitude greater than the time between Vsync pulses, the cumulative time correction may be adjusted upwards by half a Vsync period, which may be equivalent to having an additional Vsync pulse. This may also move the cumulative time correction closer to a value of zero.

Adjustments to the presentation of time of frames of a video, and changing of the cumulative time correction to effect the equivalent of adding or skipping of Vsync pulses, may be performed by any suitable hardware or software component of the computing device. For example, the operating system of the computing device may include a scheduler, which may track video frame display times and Vsync pulses, determine average estimated offsets for frame presentation times, adjust frame presentation times, and change the cumulative time correction to effect the equivalent of adding or skipping of Vsync pulses based on the tracked cumulative time correction.

FIG. 1 shows an example system suitable for video frame playback scheduling according to an implementation of the disclosed subject matter. A computing device 100 may include a system 110, a media payer 120, a renderer 130, a storage 140, and a display 150. The computing device 100 may be any suitable device, such as, for example, a computer 20 as described in FIG. 8, for implementing the system 110, the media payer 120, the renderer 130, and the storage 140. The computing device 100 may be a single computing device, or may include multiple connected computing devices, and may be, for example, a smartphone, tablet, laptop, smart watch, or other computing device that may be able to playback a video on the display 150. The display 150 may be a part of the computing device 100, or may be separate from the computing device 100. For example, the display 150 may be a touchscreen on a smartphone, a monitor connected to a laptop, or a television receiving streaming video from the computing device 100. The system 110 may be any suitable operating system that may run on the computing device. For example, the system 110 may be a mobile operating system that is part of a mobile platform used on the computing device 100. The media player 120 may be any suitable application on the computing device 100 for playing back media files, such as, for example, video files. The renderer 130 may be any suitable hardware or software component for rendering images for frames on the display 150. The storage 140 may store a video item 141 in any suitable manner. The video item 141 may be a file including video content. The video item 141 may also be hosted separately from the computing device 100, for example, in external storage or on a server operated by a media streaming service, or may be broadcast by a broadcast service, such as a TV station.

The computing device 100 may be any suitable computing device for playing back media files. For example, the computing device 100 may be a smartphone or tablet running an operating system such as the system 110 which may be part of mobile platform. The computing device 100 may include the media player 120, which may be, for example, an application capable of decoding and playing back frames from the video item 141. The computing device 100 may include the display 150, which may be a hardware display in combination with any suitable software to allow the display 150 to display images generated by the computing device 100. The display 150 may have any suitable refresh rate, such as, for example 60 Hz or 50 Hz.

The system 110 of the computing device 100 may include a scheduler 112, a Vsync generator 114, and a reference clock 116. The Vsync generator 114 may be any suitable combination of hardware and software, including, for example, clocks, that may generate Vsync pulses, which may determine when the renderer 130 sends a frame, for example, stored in a frame buffer, to be displayed on the display 150. The Vsync pulses may be generated at the same rate as the refresh rate of the display 150. For example, if the display 150 has a refresh rate of 60 Hz, the Vsync generator 114 may generate Vsync pulses at a rate of 60 Hz. The scheduler 112 may be any suitable combination of hardware and software for tracking video frame display times and Vsync pulses, determining average estimated offsets for frame presentation times, tracking a tracked cumulative time correction, adjusting frame presentation times, and making changes to frame presentation times that may be equivalent to the addition or skipping of Vsync pulses based on the tracked cumulative time correction. The scheduler 112 may also be a component of the renderer 130 instead of a component of the system 110. The reference clock 116 may be any suitable clock of the computing device 110 for generating a clock signal.

Figure 2:
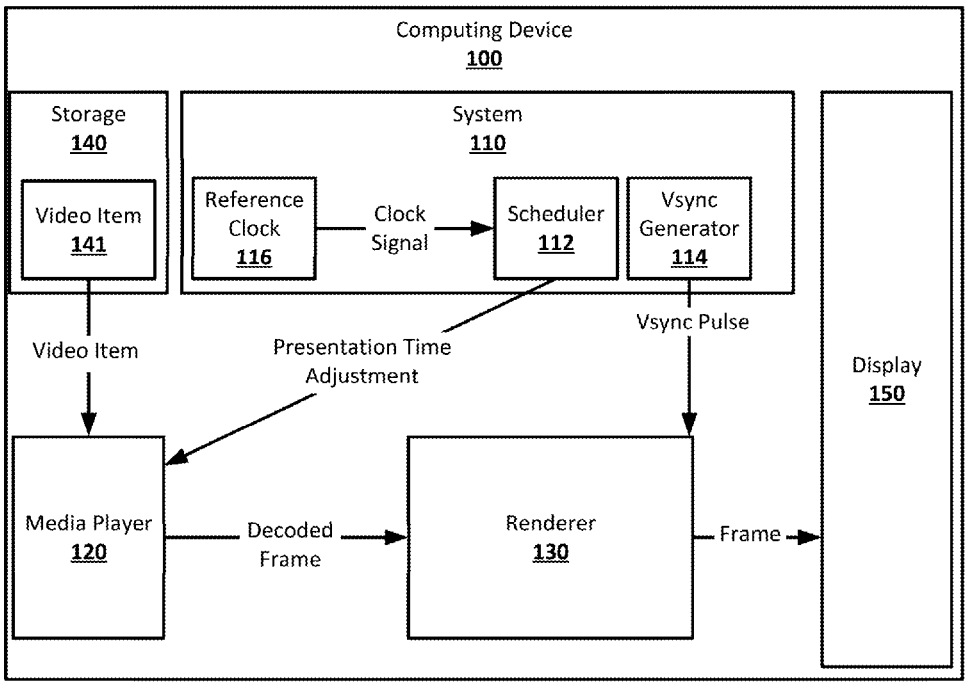
FIG. 2 shows an example arrangement for video frame playback scheduling according to an implementation of the disclosed subject matter.

FIG. 2 shows an example arrangement suitable for video playback scheduling according to an implementation of the disclosed subject matter. The media player 120 may receive the video item 141, for example, from the storage 140. For example, a user of the computing device 100 may select a control to begin playback of a movie stored in the video item 141 in the interface of the media player 120. The media player 120 may begin decoding frames of the video in the video item 141. Each decoded frame may have an associated presentation time, which may indicate the time at which the frame should be displayed on the display 150. The presentation time may be relative to any suitable clock, such as, for example, a system clock. After being decoded, the decoded frames may be sent to the renderer 130. A decoded frame may be stored, for example, in a frame buffer, until a Vsync pulse is received from the Vsync generator 114. The Vsync generator 114 may generate Vsync pulses every $\frac{1}{60}^{th}$ of a second. When a the renderer 130 receives a Vsync pulse, the frame currently at the renderer 130 may be rendered on the display 150, and the media player 120 may decode the next frame of the video item 141 to be sent to the renderer 130.

The scheduler 112 may determine an average estimated offset for any suitable number of succeeding frames. For example, the average estimated offset may be determined based on the next N frames, where N may be, for example, 12 or 20. The average estimated offset may be determined in any suitable manner. For example, the average estimated offset may be a simple average or a weighted average. The average estimated offset may be determined so as to maximize the minimum distance of the presentation time of the current frame and the next M frames, where M maybe less than equal to N, between neighboring Vsync pulses, which may minimize any artifacts from Vsync jitters, measurement jitters, or scheduling jitters. The average estimated offset may be used to adjust the presentation time of the frame being decoded by the media player 120. By adjusting the presentation time of the decoded frame, the time at which the frame is sent to the renderer 130 may be adjusted. This may ensure that the decoded frame is in the frame buffer of the renderer in time for the appropriate Vsync pulse from the Vsync pulse generator 114, and does not arrive too early and end up being displayed on the display 150 one Vsync pulse early. The scheduler 112 may adjust the presentation time of a frame at the media player 120, or at the renderer 130. The scheduler 112 may, instead of directly adjusting the presentation time of a frame, apply the adjustment to the reference clock 116, which may be equivalent to directly adjusting the presentation time of the frame. The scheduler 112 may receive a clock signal from the reference clock 116 to be used in determining the adjustment to the presentation time of the frame.

Figure 3:
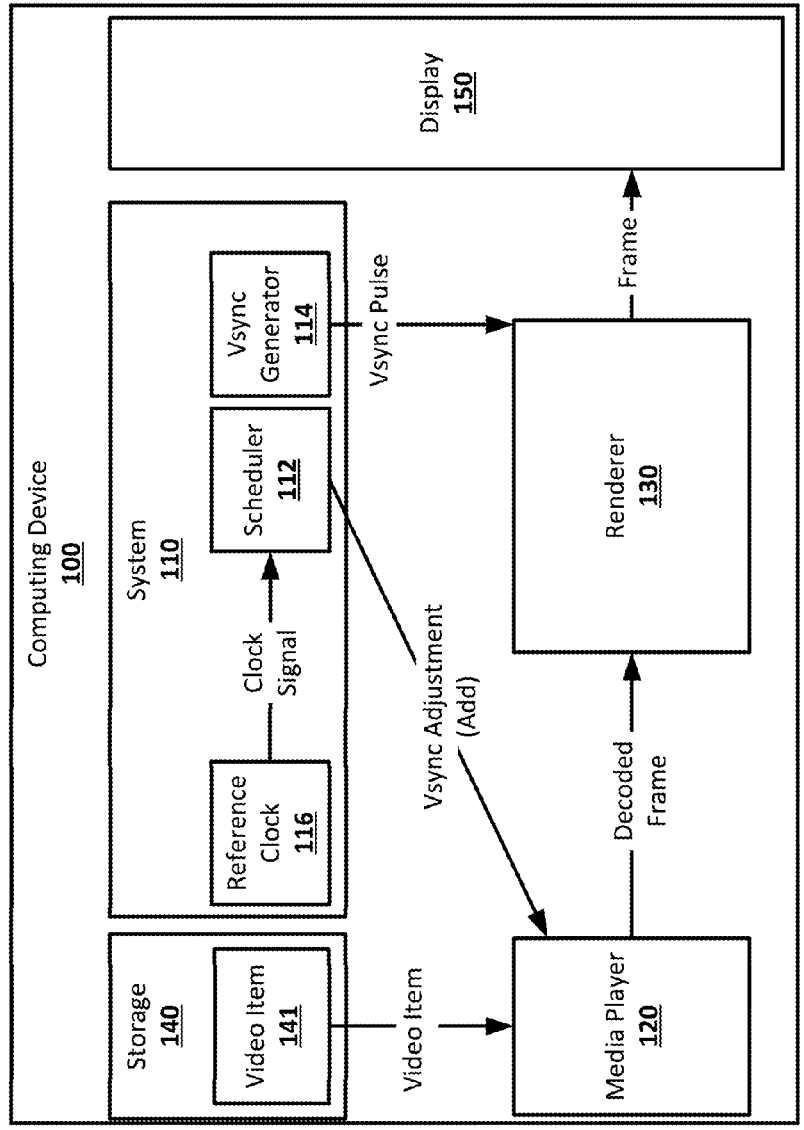
FIG. 3 shows an example arrangement for video frame playback scheduling according to an implementation of the disclosed subject matter.

FIG. 3 shows an example arrangement for video playback scheduling according to an implementation of the disclosed subject matter. The scheduler 112 may track a tracked cumulative time correction. When the magnitude of the tracked cumulative time correction exceeds a threshold, the scheduler 112 may change the cumulative time correction by a magnitude of half the distance between successive Vsync pulses, or half of a Vsync period. This may be equivalent to either adding or skipping a Vsync pulse when the cumulative time correction is used to determine the offset for adjusting the presentation time of a frame. The threshold may be, for example, the distance between Vsync pulses, or may be any other suitable threshold, such as, for example, 30% or 60% of the distance between Vsync pulses. Both a positive and a negative threshold may be used, which may be equal in magnitude, or have different magnitudes. When the tracked cumulative time correction is positive and has a magnitude greater than the threshold, the scheduler 112 may change the cumulative time correction by subtracting half a Vsync period, which may be equivalent to skipping a Vsync pulse.

The scheduler 112 may wait to subtract from the cumulative time correction, effectively skipping a Vsync pulse, until the current frame is set to be displayed for more than the minimum number of Vsync pulses. For example, the video item 141 may have a frame rate of 24 frames per second. The display 150 may have a refresh rate of 60 Hz. To display the video from the video item 141 on the display 150, 3:2 pull-down may be used. If the scheduler 112 determines that half of a Vsync period needs to be subtracted from cumulative time correction, the scheduler 112 may wait for a frame that is to be displayed for three Vsync pulses and then perform the subtraction, which may cause the frame to be displayed for only two Vsync pulses after the cumulative time correction is used to adjust the presentation time for the frame. This may prevent a frame of the video item 141 from being displayed for only one Vsync pulse.

Figure 4:
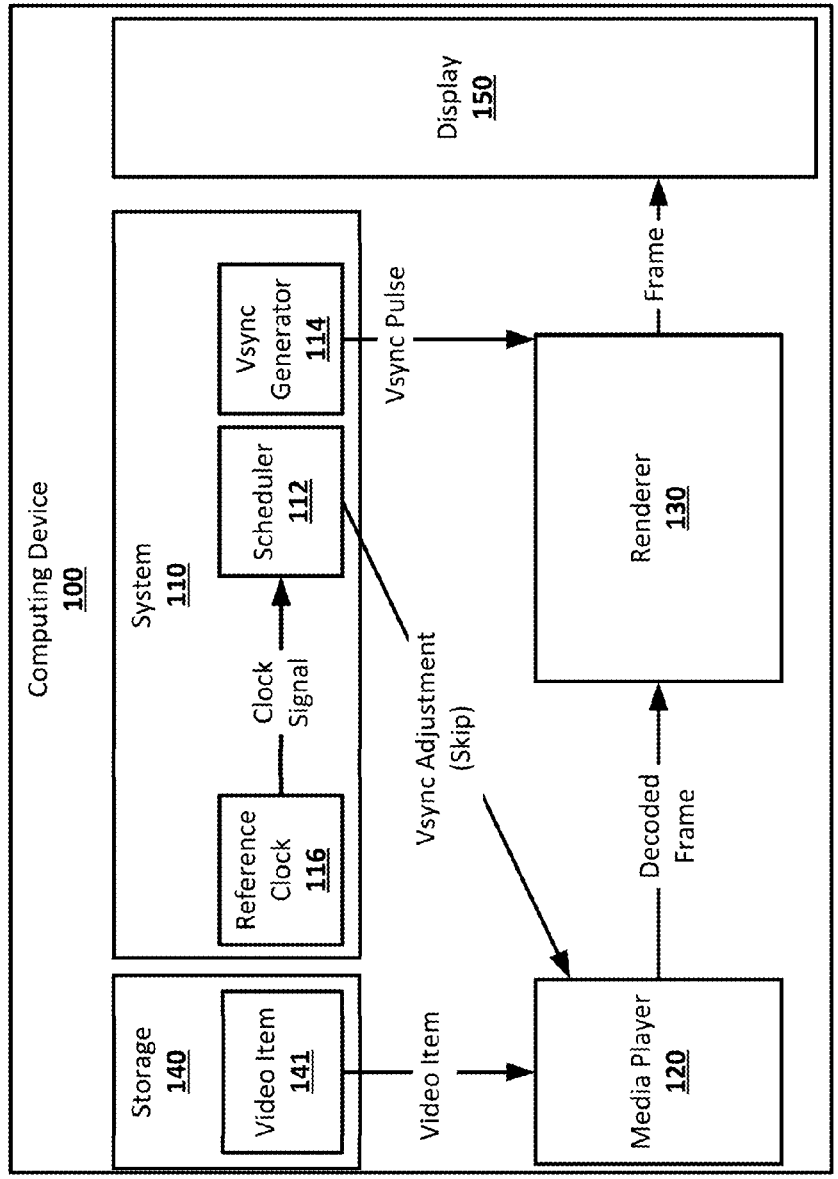
FIG. 4 shows an example arrangement for video frame playback scheduling according to an implementation of the disclosed subject matter.

FIG. 4 shows an example arrangement for video playback scheduling according to an implementation of the disclosed subject matter. The scheduler 112 may wait to add to the cumulative time correction, effectively adding a Vsync pulse, until the current frame is set to be displayed for less than the maximum number of Vsync pulses. For example, the video item 141 may have a frame rate of 24 frames per second and the display 150 may have a refresh rate of 60 Hz. If the scheduler 112 determines that half a Vsync period needs to be added to the cumulative time correction, the scheduler 112 may wait for a frame that is to be displayed for two Vsync pulses and then perform the addition. This may prevent a frame of the video item 141 from being displayed for four Vsync pulses.

Figure 5:
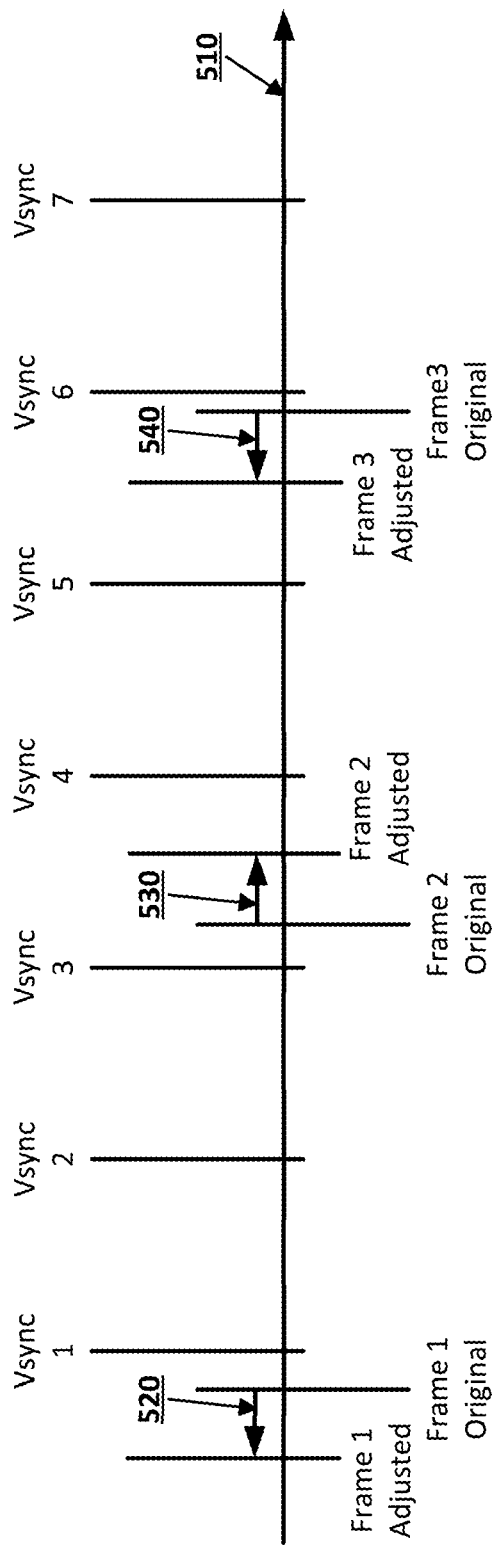
FIG. 5 shows an example of a timeline for video frame playback scheduling according to an implementation of the disclosed subject matter.

FIG. 5 shows an example of a timeline for video frame playback scheduling according to an implementation of the disclosed subject matter. A scheduling timeline 500 may include a presentation time timeline 510, which may represent the presentation times for a frame, for example, from the video item 141 as decoded by the media player 120. Frame 1 of the video item 141 may have a presentation time that places it near the expected time for Vsync 1 on the presentation time timeline. The scheduler 112 may determine an adjustment 520 for the presentation time of Frame 1 based on an average estimated offset for the next 12 frames of the video item 141. The adjustment may be applied to the original presentation time for Frame 1, resulting in the adjusted presentation time for Frame 1. The adjusted presentation time may move Frame 1 farther away from the expected time for Vsync 1. This may ensure that the media player 120 has decoded Frame 1 and sent it to the renderer 130 in advance of the Vsync generator 114 generating the Vsync pulse for Vsync 1, even if the Vsync pulse is generated earlier than expected. Frame 1 may be in a frame buffer in the renderer 130 when the Vsync pulse is received, resulting in Frame 1 being displayed on the display 150 after Vsync 1.

The video item 141 may have a frame rate of 24 frames per second, and the display 150 may have a refresh rate of 60 Hz. This may result in the use of 3:2 pull-down. Frame 1 may be displayed for three Vsync pulses, Vsync 1, Vsync 2, and Vsync 3. The media player 120 may not replace Frame 1 in the frame buffer of the renderer 130 after Vsync 1 and Vsync 2, resulting in Frame 1 being displayed a third time when Vsync pulse for Vsync 3 occurs.

The media player 120 may begin to decode Frame 2 after decoding Frame 1, based on the presentation time of Frame 2. Frame 2 may have a presentation time that falls in between the expected times for Vsync pulses for Vsync 3 and Vsync 4. The presentation time for Frame 2 may be closer to the expected time for Vsync 3 than for Vsync 4. Vsync 3 may occur later than expected, for example, after the original presentation time for Frame 2, due to, for example, jitter. This may result in Frame 2 being displayed on the display 150 instead of Frame 1, as Frame 2 would have replaced Frame 1 in the frame buffer of the renderer due to Frame 2's original presentation time. This may undesirable, as Frame 1 was meant to be displayed for three Vsync pulses. The scheduler 112 may determine an adjustment 530 for the presentation time of Frame 2, resulting in an adjusted presentation time that is closer to halfway in between the expected times for Vsync 3 and Vsync 4. This may make it less likely that Frame 2 will already be in the frame buffer of the renderer 130 if Vsync 3 occurs later than expected, while still allowing enough time for Frame 2 to be decoded by the media player 120 and placed in the frame buffer of the renderer 130 before Vsync 4, even if Vsync 4 occurs earlier than expected. Frame 2 may then be displayed on the display 150 on Vsync 4, replacing Frame 1, and remain in the frame buffer of the render 130 and be displayed for Vsync 5.

The media player may begin to decode Frame 3 after decoding Frame 2, based on the presentation time for Frame 3. The original presentation time for Frame 3 may be in between the expected times for Vsync 5 and Vsync 6. The original presentation time for Frame 3 may be closer to Vsync 6 than Vsync 5. The scheduler 112 may determine an adjustment 540 for the presentation time of Frame 3. The adjusted presentation time for Frame 3 may be closer to halfway in between Vsync 5 and Vsync 6. This may make it less likely that Frame 3 will be transferred to the frame buffer of the renderer 130 too late to be sent to the display 150 on Vsync 6 if Vsync 6 occurs earlier than expected, while still allowing enough distance from Vsync 5 that Frame 3 is not likely to have already replaced Frame 2 in the buffer if Vsync 5 occurs later than expected.

Figure 6:
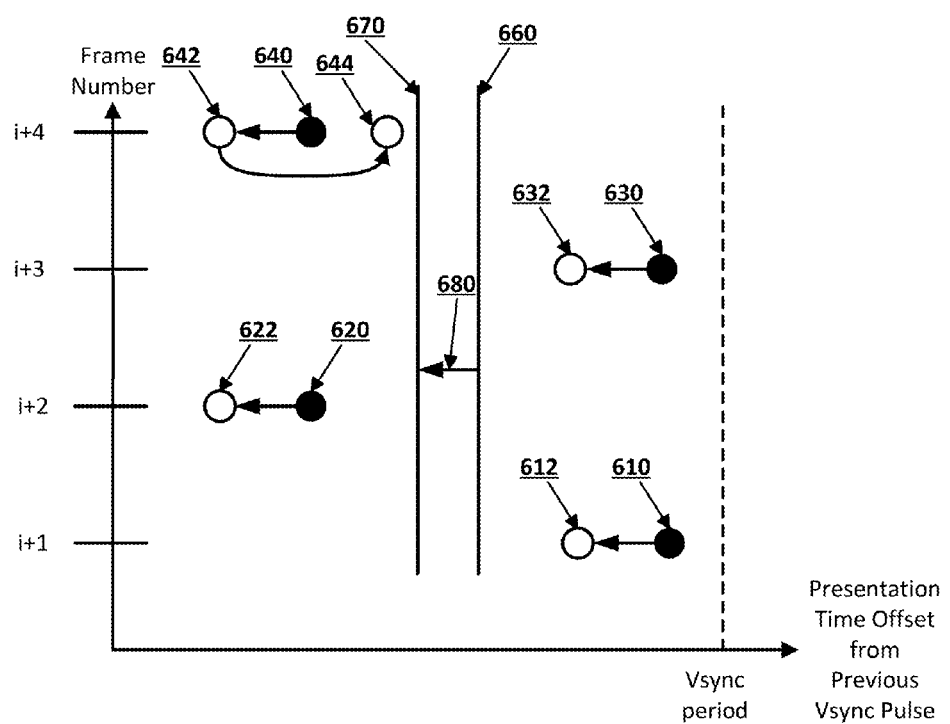
FIG. 6 shows an example of a residual timeline for video frame playback scheduling according to an implementation of the disclosed subject matter.

FIG. 6 shows an example of a residual timeline for video frame playback scheduling according to an implementation of the disclosed subject matter. For each frame of video, only the offset of the presentation time is considered from the Vsync pulse immediately preceding that presentation time. Adjustments to the presentation time for a frame, for example, as determined by the scheduler 112 based on average estimated offsets for the next N frames, may be applied to future frames. For example, the average presentation time offset 660 may be some fraction of the time difference between a Vsync n and the next Vsync n+1. The adjustment 680 may be applied to the average offset 660, resulting in adjusted presentation time offset 670. This may move each of the original presentation time offsets 610, 620, 630, and 640 for successive frames towards an immediately preceding Vsync, with adjusted presentation time offsets 612, 622, 632, and 642. This may maximize the minimum distance from Vsync pulses for the presentation times of the next M frames, where M is less than N.

An additional adjustment may be determined separately for each frame when the frame is the current frame. For example, when the frame with the adjusted presentation time offset 642 is the current frame, the adjusted presentation time offset 642 may be further adjusted to the presentation time 644, moving the presentation time closer to halfway in between the Vsync immediately preceding and the Vsync immediately following the adjusted presentation time for the adjusted presentation time offset 642.

Figure 7:
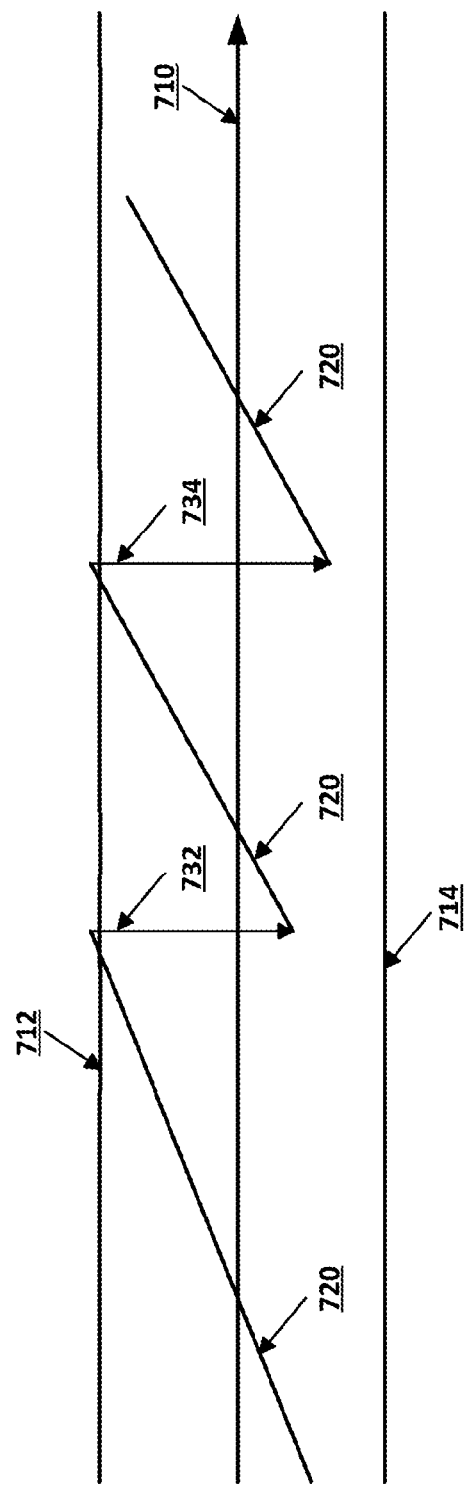
FIG. 7 shows an example of a timeline for video frame playback scheduling according to an implementation of the disclosed subject matter.

FIG. 7 shows an example of a timeline for video frame playback scheduling according to an implementation of the disclosed subject matter. Vsync pulses, for example, a generated by the Vsync generator 114, may experience jitter or drift generally in one direction. The tracked cumulative time correction 720 may increase with each successive frame displayed along the presentation timeline 710. When the tracked cumulative time correction 720 has a magnitude greater than a threshold 712, a half Vsync period 732 may be subtracted from the tracked cumulative time correction 720, which may be equivalent to skipping a Vsync pulse. This may reset the tracked cumulative time correction 720, which may then begin to increase as further frames are displayed. When the tracked cumulative time correction 720 again has a magnitude greater than the threshold 712, a half Vsync period 734 may be subtracted from the tracked cumulative time correction 720, which may be equivalent to skipping another Vsync pulse. The threshold 712 may be, for example, equal to 30% the expected time between Vsync pulses, for example $\frac{1}{200}^{th}$ of a second, or any other suitable threshold value. A threshold 714 may be, for example, the negative of the threshold 714, and may be, for example, $-\frac{1}{60}^{th}$ of a second. When the tracked cumulative time correction 720 decreases, a half Vsync period may be added when the tracked cumulative time correction is less than the threshold 714, for example is negative with a magnitude greater than threshold 712.

Figure 8:
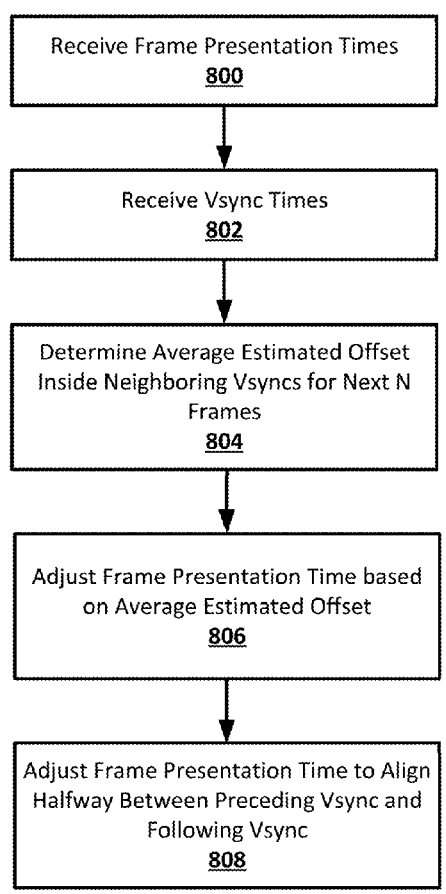
FIG. 8 shows an example of a process for video frame playback scheduling according to an implementation of the disclosed subject matter.

FIG. 8 shows an example of a process for video frame playback scheduling according to an implementation of the disclosed subject matter. At 800, frame presentation times may be received. For example, the scheduler 112 may receive the presentation time for frames of the video item 141 being decoded by the media player 120. The presentation time may indicate the time, according to any suitable clock, such a system clock, at which the frame should be displayed on the display 150 of the computing device 100.

At 802, Vsync times may be received. For example, the scheduler 112 may receive from the Vsync generator 114 the expected times of the Vsync pulses. The scheduler 112 may also receive, or track, actual Vsync pulse times.

At 804, an average estimated offset inside neighboring Vsyncs for the next N frames may be determined. For example, the scheduler 112 may determine the average estimated offset for the current frame by averaging estimated offset for the next N frames from the video item 141. N may be for, example, 12, 20, or any other suitable number greater than two. The average estimated offset may be determined in order to move the presentation time for a frame closer to halfway between two neighboring Vsync pulses.

At 806, a frame presentation time may be adjusted based on the average estimated offset. For example, the presentation time for a frame from the video item 141 being decoded by the media player 120 may be adjusted based on the average estimated offset, resulting in an adjusted presentation time for the frame.

At 808, the frame presentation time may be adjusted to align halfway between a preceding Vsync and a following Vsync. For example, the adjusted frame presentation time for the frame from the video item 141 may be further adjusted to be near the halfway point between the expected Vsync pulse times before and after the original presentation time for the frame. This may make it less likely that the frame arrives at the renderer too late or too early, and either misses a Vsync pulse that occurs earlier than expected or ends up being displayed by a Vsync pulse that occurs later than expected.

Figure 9:
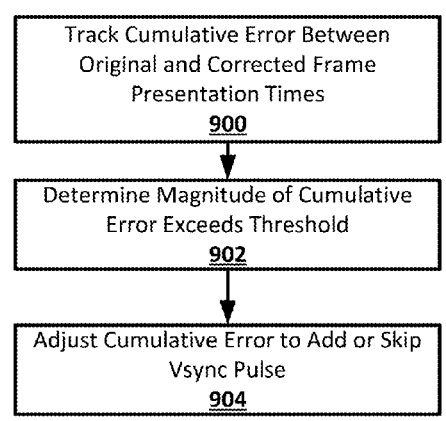
FIG. 9 shows an example of a process for video frame playback scheduling according to an implementation of the disclosed subject matter.

FIG. 9 shows an example of a process for video frame playback scheduling according to an implementation of the disclosed subject matter. At 900, a cumulative error between original and corrected frame presentation times may be tracked. For example, the scheduler 112 may track the cumulative time correction based on the adjustments applied to the frames from the video item 141 as they are decoded by the media player 120 and sent to the renderer 130.

At 902, it may be determined that the magnitude of the cumulative error exceeds a threshold. For example, the cumulative time correction 720 may have a magnitude greater than a threshold 712 and 714, as determined by, for example, the scheduler 112. The threshold 712 and 714 may have both a positive and negative value, and may have a magnitude of, for example, the distance between two successive Vsync pulses, or any other suitable magnitude, such as ⅗ths of the distance between two successive Vsync pulses. The cumulative time correction 720 may be positive or negative, and may exceed the threshold 712 and 714 in either the positive or negative direction.

At 904, the cumulative error may be adjusted to add or skip a Vsync pulse. For example, the scheduler 112 add or subtract half of a Vsync period from the cumulative error. If the cumulative error, or tracked cumulative time correction 720, exceeds the threshold 712 in the positive direction, the scheduler 112 may subtract half a Vsync period from the tracked cumulative error 720, effectively skipping a Vsync pulse. If the cumulative error, or tracked cumulative time correction 720, exceeds the threshold 714 in the negative direction, the scheduler 112 may add half of Vsync period to the tracked cumulative time correction 720, effectively adding a Vsync pulse. Subtraction from the tracked cumulative time correction 720 may occur when the current frame is designated to be displayed for more than the minimum of Vsync pulses, based on the frame rate of the video item 141. Addition to the tracked cumulative time correction 720 may occur when the current frame is designated to be displayed for less than the maximum number of Vsync pulses, based on the frame rate of the video item 141.

Figure 10:
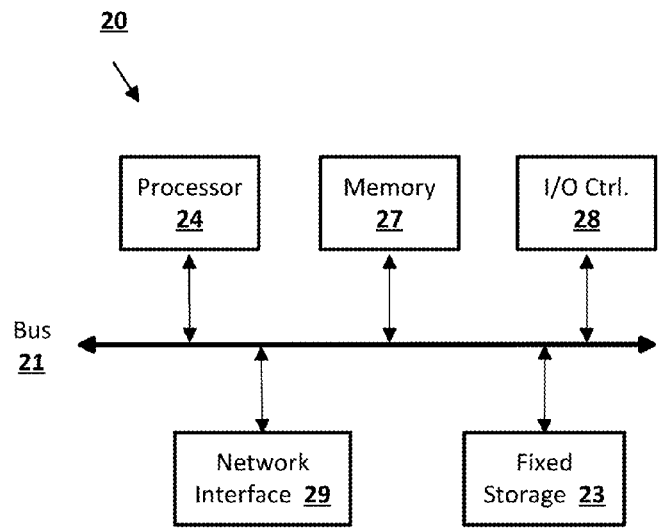
FIG. 10 shows a computer according to an embodiment of the disclosed subject matter.

Embodiments of the presently disclosed subject matter may be implemented in and used with a variety of component and network architectures. FIG. 10 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 11.

Many other devices or components (not shown) may be connected in a similar manner, such as document scanners, digital cameras, auxiliary, supplemental, or backup systems, or the like. Conversely, all of the components shown in FIG. 10 need not be present to practice the present disclosure. The components can be interconnected in different ways from that shown. The operation of a computer such as that shown in FIG. 10 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 11:
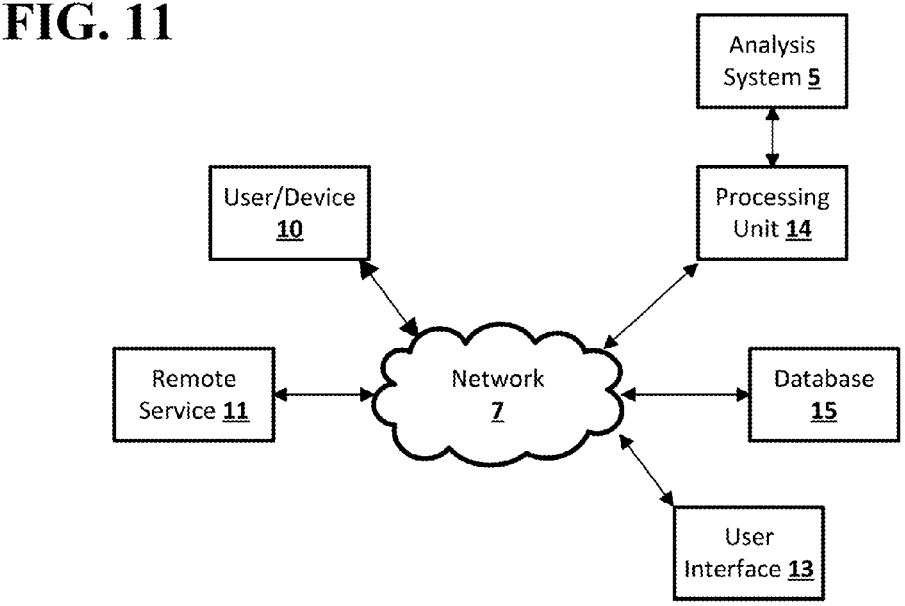
FIG. 11 shows a network configuration according to an embodiment of the disclosed subject matter.

FIG. 11 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving a presentation time for a frame of a video;
   determining an offset for the frame of video based on at least one succeeding frame of the video and at least one Vsync pulse time;
   adjusting the presentation time for the frame of the video based on the offset to generate an adjusted presentation time that is closer to a halfway point between a first Vsync pulse and a second Vsync pulse than the presentation time;
   tracking a cumulative time correction based on adjustments made to the presentation times for one or more frames of the video;
   determining that a magnitude of the cumulative time correction exceeds the magnitude of a positive or negative threshold; and
   adding or subtracting from the cumulative time correction based on the determination that the magnitude exceeds the positive or negative threshold.

2. The computer-implemented method of claim 1, further comprising:
   sending the frame of video to a renderer based on the adjusted presentation time.

3. The computer-implemented method of claim 1, wherein the offset is based on 12 succeeding frames.

4. The computer-implemented method of claim 1, wherein the offset is an average estimated offset.

5. The computer-implemented method of claim 4, wherein the average estimated offset is determined by averaging, over the next N succeeding frames to the frame of the video, a presentation time plus a cumulative time correction for each frame, a tracked time difference between successive frames multiplied by the frame number within the set of frames being evaluated minus a tracked base time for a previous Vsync pulse, modulus a tracked time difference between successive Vsync pulses, wherein the tracked time difference between successive Vsync pulses is a Vsync period.

6. The computer-implemented method of claim 4, wherein adjusting the presentation time further comprises:
   dividing a Vsync period by two;
   subtracting the offset from the result of dividing the Vsync period by two to determine a time correction;
   applying the time correction to the presentation time of the frame of the video to generate the adjusted presentation time; and
   aligning the adjusted presentation time halfway between the first Vsync pulse and second Vsync pulse, wherein the first Vsync pulse and the second Vsync pulse are consecutive.

7. The computer-implemented method of claim 1, wherein the offset is a weighted average estimated offset.

8. The computer-implemented method of claim 1, wherein at least half of a Vsync period is subtracted from the cumulative time correction when the cumulative time correction is positive and is greater than the positive threshold.

9. The computer-implemented method of claim 8, wherein the at least half of a Vsync period is subtracted from the cumulative time correction to effect the display of a frame of the video that is designated to be displayed for more than a minimum number of Vsync pulses.

10. The computer-implemented method of claim 1, wherein at least half of a Vsync period is added to the cumulative time correction when the cumulative time correction is negative and is less than the negative threshold.

11. The computer-implemented method of claim 10, wherein the at least half of a Vsync period is added to the cumulative time correction to effect the display of a frame of the video that is designated to be displayed for less than a maximum number of Vsync pulses.

12. The computer-implemented method of claim 1, wherein the positive threshold is between 25% of Vsync period and 100% of a Vsync period, and wherein the negative threshold is between negative 25% of a Vsync period and negative 100% of a Vsync period.

13. A computer-implemented system for video frame playback scheduling:
   a media player adapted to decode frames from a video item;
   a renderer adapted to receive frames of the video item decoded by the media player;
   a Vsync generator adapted to generate Vsync pulses; and
   a scheduler adapted to receive a presentation time for a frame of a video, determine an offset for the frame of video based on at least one succeeding frame of the video and at least one Vsync pulse time, adjust the presentation time for the frame of the video based on the offset to generate an adjusted presentation time that is closer to a halfway point between a first Vsync pulse and a second Vsync pulse than the presentation time, track a cumulative time correction based on adjustments to the presentation times for on or more frames of the video, and add or subtract at least half of a Vsync period to or from the cumulative time correction when the cumulative time correction has a magnitude greater than the magnitude of a positive or negative threshold.

14. The computer-implemented system of claim 13, wherein the scheduler is adapted to adjust the presentation times for the frames of the video such that adjusted presentation times for the frames of the video are closer to halfway in between the expected times for successive Vsync pulses than the presentation times for the frames of the video.

15. The computer-implemented system of claim 13, wherein the scheduler is adapted to subtract the at least half of a Vsync period from the cumulative time correction when the cumulative time correction is positive and exceeds the positive threshold.

16. The computer-implemented system of claim 13, wherein the scheduler is adapted to add the at least half of a Vsync period to the cumulative time correction when the cumulative time correction is negative and is less than the negative threshold.

17. The computer-implemented system of claim 13, wherein the scheduler is adapted to adjust the presentation times based on an average estimated offset.

18. The computer-implemented system of claim 17, wherein the average estimated offset for a frame is based on a presentation time, a cumulative time correction, a tracked time difference between successive frames multiplied by the frame number, a tracked base time for a previous Vsync pulse, and a tracked time difference between successive Vsync pulses, for the next N succeeding frames to the frame.

19. A system comprising: one or more computers and one or more storage devices storing instructions which are operable, when executed by the one or more computers, to cause the one or more computers to perform operations comprising:
  receiving a presentation time for a frame of a video;
  determining an offset for the frame of video based on a presentation for at least one succeeding frame of the video and at least one Vsync pulse time;
  adjusting the presentation time for the frame of the video based on the offset to generate an adjusted presentation time that is closer to a halfway point between a first Vsync pulse and a second Vsync pulse than the presentation time;
  tracking a cumulative time correction based on adjustments made to the presentation times for one or more frames of the video;
  determining that a magnitude of the cumulative time correction exceeds the magnitude of a positive or negative threshold; and
  adding or subtracting from the cumulative time correction based on the determination that the magnitude exceeds the positive or negative threshold.

* * * * *